7632X
L. Hitchcock,
Saw.
Patented June 29, 1833.
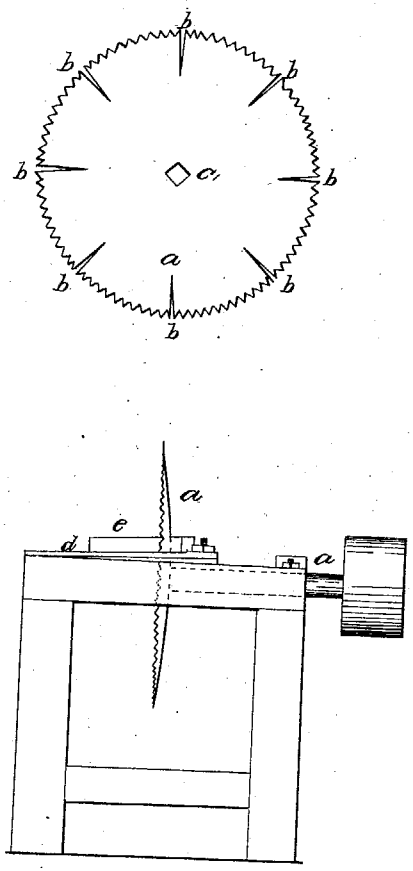
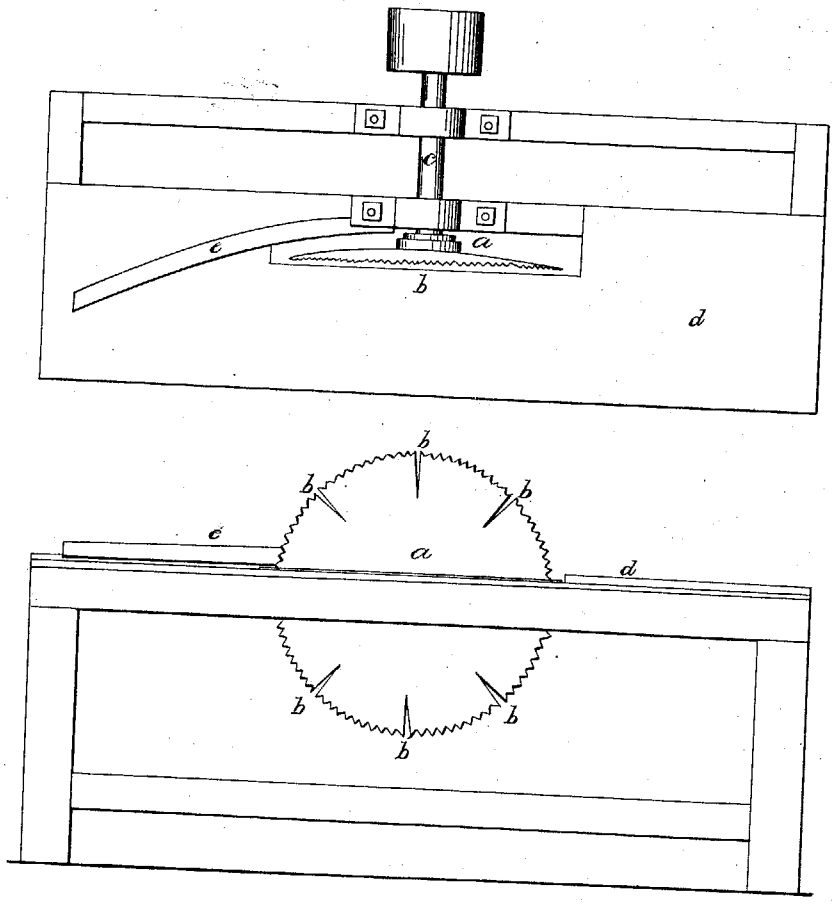
AM. PHOTO-LITHO. CO. N.Y. (OSBORNE'S PROCESS)

7632X June 29. 1833

Levi Hitchcock of Springfield Massachusetts
Letters Patent

The Schedule referred to in these Letters Patent and making part of the same, containing a description in the words of the said Levi Hitchcock himself of his improvement in the circular saw.

To all to whom these presents shall come. Be it known that I, Levi Hitchcock of Springfield in the County of Hampden and Commonwealth of Massachusetts, have invented a new and useful improvement in the operation of sawing circular forms or figures from wood, and that the following is a full and exact description of the construction and operation of the machine used therefor, as invented or improved by me. This invention or improvement consists of a circular saw having one surface concave, and the other convex, the radii of the circular plate forming a curved angle with its axis, greater or less in proportion to the desired curvature of the figure to be wrought.

The circular saw is fixed on its axis in any of the usual modes, and the radii from one side of the periphery through the axis to the opposite side must form a regular and uniform curve, thus giving to the circular plate, the form of a small section of a hollow globe. The teeth of the saw are formed upon the periphery in the usual manner. The saw must have triangular notches or slits cut from the outer edge - circumference of the plate at suitable distances from each other, extending from one fourth to one half the distance from the periphery toward the axis. said notches or slits may be about six or eight in number. they facilitate the beating the plane plate into the shape required, and and assist the operation of the saw. Having given the circular saw its proper concave and convex form - fixed it upon its axis - and placed it upon the frame where it is to be used. a table or platform is to be prepared, on which to lay the material which is to be wrought, (whether it be by sawing it into fellies for coach or waggon wheels, or other similar forms) this table or platform lies on both sides or surfaces of the saw.

[illegible]

76324 a little above the nut or collar by which it is fastened to the axis at an inclination which brings it at right angles with the marginal surface of the saw, so that the figure when wrought shall also be rectangular. On this platform and on the convex side of the saw plate is fixed a curved gauge or guide corresponding with the curva-ture of the saw, against which the material to be wrought is prest-sed with the hand, at the same time it is pressed against the teeth of the saw, until by sliding it upon the platform the saw shall have passed through it.

That which I claim as new in this invention or im-provement, is the application of the circular saw to the cutting and shaping of circular forms such as Coach and Waggon fellows, and all kinds of circular work for carriages and chairs and the meth-od of adapting the shape of the saw, to effect that object.

[illegible] Witnesses
[illegible] [illegible] Justin Willard
Geo. B. Upham

Levi Hitchcock (540 words)

(Patented 29. June 1833)